United States Patent
Shen et al.

(10) Patent No.: US 9,901,902 B1
(45) Date of Patent: Feb. 27, 2018

(54) AMYLOSE DERIVATIVE AND OPTICAL ISOMER SEPARATING AGENT CONTAINING SAME

(71) Applicant: DAICEL CORPORATION, Osaka-shi, Osaka (JP)

(72) Inventors: Jun Shen, Harbin (CN); Zhongzheng Yang, Harbin (CN); Geng Li, Harbin (CN); Yoshio Okamoto, Harbin (CN)

(73) Assignee: DAICEL CORPORATION, Osaka-Shi (JP)

( * ) Notice: Subject to any disclaimer, the term of this patent is extended or adjusted under 35 U.S.C. 154(b) by 0 days.

(21) Appl. No.: 15/472,831

(22) Filed: Mar. 29, 2017

(30) Foreign Application Priority Data

Aug. 26, 2016 (JP) .................................. 2016-165637

(51) Int. Cl.
  *B01J 20/24* (2006.01)
  *C08B 33/02* (2006.01)
  (Continued)

(52) U.S. Cl.
  CPC ............... *B01J 20/24* (2013.01); *B01J 20/29* (2013.01); *B01J 20/3085* (2013.01); *C08B 33/02* (2013.01); *B01J 2220/80* (2013.01)

(58) Field of Classification Search
  CPC ........ B01J 20/24; B01J 20/29; B01J 20/3085; C08B 33/02
  (Continued)

(56) References Cited

U.S. PATENT DOCUMENTS

2009/0264639 A1   10/2009   Okamoto et al.

FOREIGN PATENT DOCUMENTS

WO   WO 2008/029785 A1   3/2008

OTHER PUBLICATIONS

Kaida et al., "Optical Resolution on Regioselectively Carbamoylated Cellulose and Amylose with 3,5-Dimethylphenyl and 3,5-Dichlorophenyl Isocyanates", Bull. Chem. Soc. Jpn., vol. 66, 1993, pp. 2225-2232.

(Continued)

*Primary Examiner* — Edward Johnson
(74) *Attorney, Agent, or Firm* — Birch, Stewart, Kolasch & Birch, LLP

(57) ABSTRACT

Provided are a novel amylose derivative which exhibits excellent optical isomer separability and which is suitable as an optical isomer separating agent; and an optical isomer separating agent containing the amylose derivative. A task is attained by an amylose derivative having a constituent unit represented by formula (I) below; In below formula (I), $R^1$ is a substituent group represented by any of formulae 1 to 3 below, and $R^2$ is a substituent group represented by any of formulae a to g below. $R^1$ and $R^2$ are different substituent groups. A combination of $R^1$ and $R^2$ in which $R^1$ is a substituent group represented by structural formula 3 and $R^2$ is a substituent group represented by structural formula c is excluded from the formula (I).

(Continued)

-continued

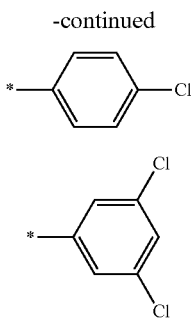

5 Claims, 3 Drawing Sheets

(51) Int. Cl.
*B01J 20/29* (2006.01)
*B01J 20/30* (2006.01)

(58) Field of Classification Search
USPC .......................................................... 502/404
See application file for complete search history.

(56) References Cited

OTHER PUBLICATIONS

Koschella et al., "First Synthesis of 3-O-Functionalized Cellulose Ethers via 2,6-Di-O-Protected Silyl Cellulose", Macromol. Biosci., vol. 1, 2001, pp. 49-54.

Okamoto et al., "Controlled Chiral Recognition of Cellulose Triphenylcarbamate Derivatives Supported on Silica Gel", Journal of Chromatography, vol. 363, 1986, pp. 173-186.

Okamoto et al., "Useful Chiral Stationary Phases for HPLC. Amylose Tris (3,5-dimethylphenylcarbarnate) and Tris (3,5-dichlorophenylcarbamate) Supported on Silica Gel", Chemistry Letters, vol. 9, 1987, pp. 1857-1860.

Tanaka, "Synthesis and chiral recognition of regioselectively substituted cellulose derivatives", Special Research Thesis, Department of Materials Science and Engineering of National Institute of Technology, Suzuka College, submitted on Jan. 23, 2009, 29 pages.

Yashima et al., "Enantioseparation on 4-Halogen-Substituted Phenylcarbarnates of Amylose as Chiral Stationary Phases for High-Performance Liquid Chromatography", Chirality, vol. 9, 1997, pp. 63-68.

AMYLOSE DERIVATIVE AND OPTICAL ISOMER SEPARATING AGENT CONTAINING SAME

BACKGROUND OF THE INVENTION

Field of the Invention

The present invention relates to an amylose derivative that is useful for separating optical isomers, and to an optical isomer separating agent containing same.

Description of the Related Art

Polysaccharide derivatives obtained by modifying hydroxyl groups present in polysaccharides, such as cellulose and amylose, with a variety of substituent groups are known to exhibit high optical resolution capability as chiral stationary phases in chromatography, and many types of polysaccharide derivative have been synthesized in the past.

One synthesis example of a polysaccharide derivative that is useful as this type of optical isomer separating agent is a synthesis example in which substituent groups are introduced separately at the 2-position, 3-position and 6-position by means of a process in which a hydroxyl group at the 6-position of a polysaccharide is protected by means of trityl chloride, and then deprotected (see Bull. Chem. Soc. Jpn., 66, 2225-2232, 1993).

However, separately substituting at the 2-position and 3-position, which have similar reactivity, was difficult when substituting hydroxyl groups in polysaccharides. With regard to this matter, examples have been reported in which cellulose derivatives in which different substituent groups are introduced at the adjacent 2-position and 3-position (3-allyl cellulose, 3-methyl cellulose and 3-methyl-2,6-acetyl cellulose) are synthesized (see Macromol. Biosci 1, 49-54, 2001).

However, no derivatives are known in which the same type of substituent group is introduced at the 2-position and 6-position but a different type of substituent group is introduced at the 3-position of amylose when using amylose as a polysaccharide.

List of prior art documents
Ref. 1: Bull. Chem. Soc. Jpn., 66, 2225-2232, 1993
Ref. 2: Macromol. Biosci. 1, 49-54, 2001
Ref. 3: J. Chromatogr. A 363, 173-186, 1986
Ref. 4: Chirality 9, 63-68, 1997
Ref. 5: Chem. Lett. 9, 1857-1860, 1987

SUMMARY OF THE INVENTION

The present invention provides a novel amylose derivative which exhibits excellent optical isomer separability and which is suitable as an optical isomer separating agent; and an optical isomer separating agent containing the amylose derivative.

The present invention provides an amylose derivative having a constituent unit represented by formula (I) below.

In an amylose derivative having a constituent unit represented by formula (I) below, hydroxyl groups at the 2-position and 6-position of amylose are substituted by the same type of substituent group, and the hydroxyl group at the 3-position of amylose is substituted by a different type of substituent group from that substituted at the 2-position and 6-position.

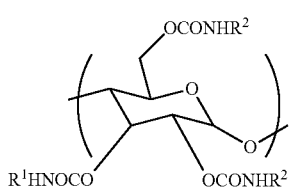

(I)

(In formula (I), $R^1$ is a substituent group represented by any of structural formulae 1 to 3 below, $R^2$ is a substituent group represented by any of structural formulae a to g below, and two $R^2$ groups are the same substituent group. $R^1$ and $R^2$ are different substituent groups. A combination of $R^1$ and $R^2$ in which $R^1$ is a substituent group represented by structural formula 3 and $R^2$ is a substituent group represented by structural formula c is excluded from the formula (I).)

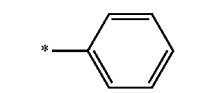

1

2

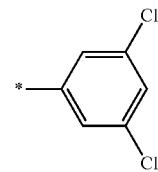

3

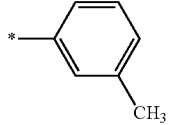

a

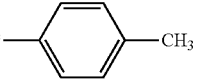

b

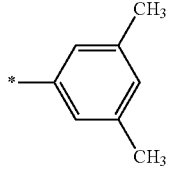

c

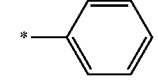

d

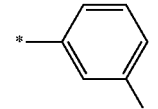

e

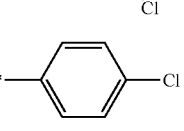

f g

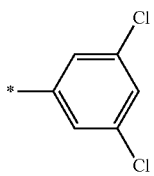

In addition, as a method for producing an amylose derivative represented by formula (I), the present invention provides a method for producing an amylose derivative, the method including a 2-position and 6-position protection step in which hydroxyl groups at the 2-position and 6-position of an amylose constituent unit are protected by protecting groups; a 3-position modification step in which a hydroxyl group at the 3-position of the constituent unit, whose 2-position and 6-position are protected, is modified by a first substituent group represented by formula (II-1) below; a 2-position and 6-position deprotection step in which protecting groups at the 2-position and 6-position of the constituent unit, whose 3-position is modified are removed; and a 2-position and 6-position modification step in which hydroxyl groups at the 2-position and 6-position, from which protecting groups have been removed, are modified by a second substituent group represented by formula (II-2) below (however, $R^3$ in formula II-1 and $R^4$ in formula II-2 are different substituent groups).

—CO—NH—$R^3$     (II-1)

In the formula, $R^3$ is a substituent group represented by any of formulae 1 to 3.

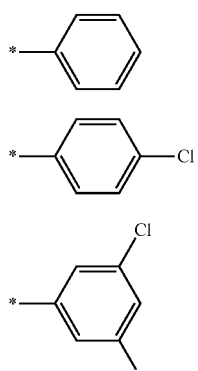

1

2

3

—CO—NH—$R^4$     (II-2)

In the formula, $R^4$ is a substituent group represented by any one of formulae a to g.

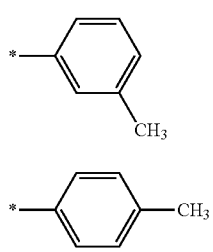

a b

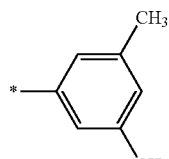

c

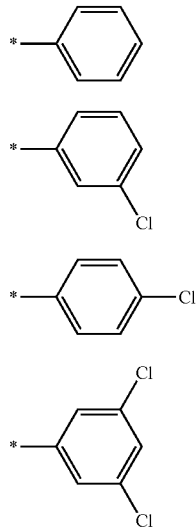

d e f g

In addition, the present invention relates to an optical isomer separating agent containing this polysaccharide derivative.

In addition, in cases where $R^2$ is a substituent group represented by any of structural formulae a, b, e and f when $R^1$ is a substituent group represented by structural formula 1 in the constituent unit represented by formula (I), cases where $R^2$ is a substituent group represented by any of structural formulae a, c, d, e and g when $R^1$ is a substituent group represented by structural formula 2 in the constituent unit represented by formula (I) and cases where $R^2$ is a substituent group represented by any of structural formulae a, b, d, e and f when $R^1$ is a substituent group represented by structural formula 3 in the constituent unit represented by formula (I), the present invention is significantly more effective from the perspective of providing an amylose derivative which exhibits excellent optical isomer separability and which is suitable as an optical isomer separating agent.

In addition, the present invention provides an optical isomer separating agent that contains this amylose derivative, and can therefore provide an optical isomer separating agent that contains an amylose derivative which exhibits excellent optical isomer separability and which is suitable as an optical isomer separating agent.

DESCRIPTION OF THE EMBODIMENTS

Figure 1:
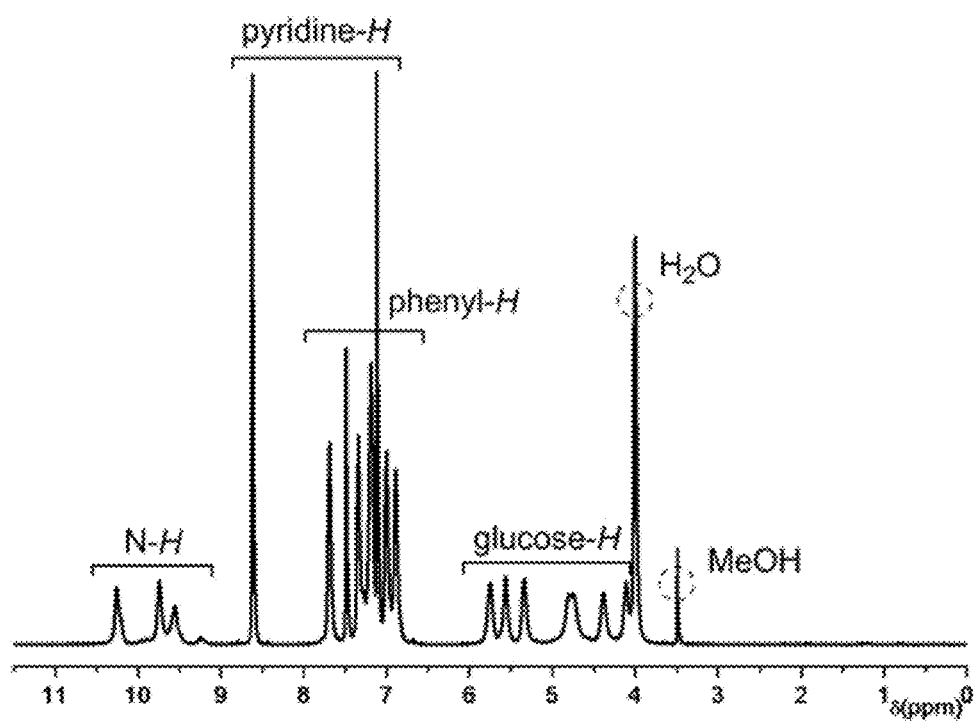
FIG. 1 is a diagram showing a $^1$H NMR spectrum in pyridine-$d_5$ of amylose derivative 1f at 80° C.

The amylose derivative of the present invention has a constituent unit in which the hydrogen atoms in the hydroxyl groups at the 2-position and 6-position of amylose are substituted by substituent groups that are different from that substituted for the hydrogen atom in the hydroxyl group at the 3-position of amylose, as shown by formula (I).

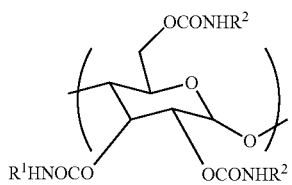

(In formula (I), $R^1$ is a substituent group represented by any of structural formulae 1 to 3 below, $R^2$ is a substituent group represented by any of structural formulae a to g below, and the two $R^2$ groups are the same substituent group. $R^1$ and $R^2$ are different substituent groups. A combination of $R^1$ and $R^2$ in which $R^1$ is a substituent group represented by structural formula 3 and $R^2$ is a substituent group represented by structural formula c is excluded from the formula (I).)

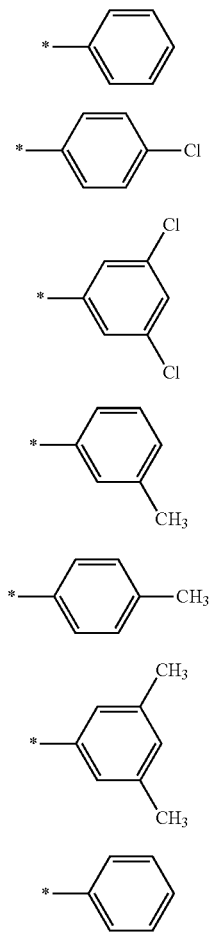

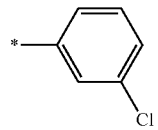

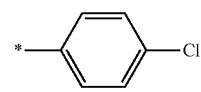

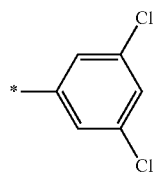

In the present invention, the asterisks (*) shown in structural formulae 1 to 3 and structural formulae a to g denote the position of substitution of a hydrogen atom of a hydroxyl group in amylose.

The average degree of polymerization of amylose (the average number of pyranose or furanose rings in 1 molecule of amylose) is preferably 5 or more, and more preferably 10 or more, with no particular upper limit, but this average degree of polymerization is preferably 1000 or less from the perspective of ease of handling, and is more preferably 5 to 1000, further preferably 10 to 1000, and particularly preferably 10 to 500.

In the amylose derivative of the present invention, hydroxyl groups in the constituent unit represented by formula (I) are substituted by —CO—NH—R groups.

R is represented by $R^1$ at the 3-position of amylose, and R is represented by $R^2$ at the 2-position and 6-position of amylose.

$R^1$ and $R^2$ are different substituent groups and the two $R^2$ groups are the same type of substituent group, but in the present invention, this excludes a case in which when $R^1$ is a substituent group represented by structural formula 3, $R^2$ is a substituent group represented by structural formula c.

In the structural unit represented by formula (I), as long as an optical resolution effect can be achieved by substituent groups represented by $R^1$ and $R^2$, it is possible for not all the hydroxyl groups at these positions in this constituent unit to be substituted. In the structural unit represented by formula (I), the rate of introduction of substituent groups represented by $R^1$ and $R^2$ into the amylose derivative of the present invention is preferably 70% to 100%, more preferably 80% to 100%, and particularly preferably 100%.

Moreover, this rate of introduction (%) is defined as follows. In the amylose derivative of the present invention, this rate of introduction is the ratio of the total number of substituent groups represented by the formulae mentioned above in the amylose derivative of the present invention relative to the total number of hydroxyl groups in the constituent unit mentioned above when the substituent groups represented by the formulae mentioned above in the amylose derivative of the present invention are deemed to have been substituted by hydroxyl groups in the constituent unit mentioned above. The rate of introduction can be determined by using a publicly known analytical method such as NMR or elemental analysis, which can identify the type and/or bonding position of substituent groups, and can also be determined according to the type and bonding position of substituent groups.

In cases, for example, where substituent groups represented by the formulae mentioned above substitute only hydroxyl groups in the amylose derivative of the present invention, this rate of introduction is a numerical value obtained by multiplying, by 100, the ratio of the number of substituent groups represented by $R^1$ and $R^2$ relative to the total number of hydroxyl groups in the amylose following the substitution.

In the constituent unit represented by formula (I), in cases where $R^1$ is a substituent group represented by structural formula 1, $R^2$ is preferably a substituent group represented by any of structural formulae a, b, e and f, more preferably a substituent group represented by any of structural formulae a, e and f, and particularly preferably a substituent group represented by structural formula a.

In the constituent unit represented by formula (I), in cases where $R^1$ is a substituent group represented by structural formula 2, $R^2$ is preferably a substituent group represented by any of structural formulae a, c, d, e and g, more preferably a substituent group represented by any of structural formulae c and e, and particularly preferably a substituent group represented by structural formula c.

In the constituent unit represented by formula (I), in cases where $R^1$ is a substituent group represented by structural formula 3, $R^2$ is preferably a substituent group represented by any of structural formulae a, b, d, e and f, more preferably a substituent group represented by any of structural formulae a and d, and particularly preferably a substituent group represented by structural formula a.

Moreover, because the separation behavior of racemates differs according to the type of racemate to be separated and the type of substituent group $R^1$ and $R^2$ in the amylose derivative, it is possible to select the type of substituent group $R^1$ and $R^2$ according to the type of racemate to be separated.

In the constituent unit represented by formula (I), $R^1$ and $R^2$ are different substituent groups.

Therefore, a combination in which $R^2$ is a substituent group represented by structural formula d when $R^1$ is a substituent group represented by structural formula 1, a combination in which $R^2$ is a substituent group represented by structural formula f when $R^1$ is a substituent group represented by structural formula 2 and a combination in which $R^2$ is a substituent group represented by structural formula g when $R^1$ is a substituent group represented by structural formula 3 are excluded from the present invention.

The amylose derivative of the present invention can be produced using the following method.

That is, the amylose derivative of the present invention can be produced using a method that includes a 2-position and 6-position protection step in which hydroxyl groups at the 2-position and 6-position of an amylose constituent unit are protected by protecting groups; a 3-position modification step in which a hydroxyl group at the 3-position of the constituent unit, whose 2-position and 6-position are protected, is modified by a first substituent group represented by formula (II-1) below; a 2-position and 6-position deprotection step in which protecting groups at the 2-position and 6-position of the constituent unit, whose 3-position is modified are removed; and a 2-position and 6-position modification step in which hydroxyl groups at the 2-position and 6-position, from which protecting groups have been removed, are modified by a second substituent group represented by formula (II-2) below.

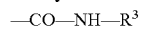

In the formula, $R^3$ is a substituent group represented by any of formulae 1 to 3.

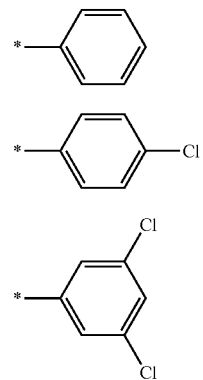

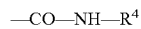

In the formula, $R^4$ is a substituent group represented by any one of formulae a to g.

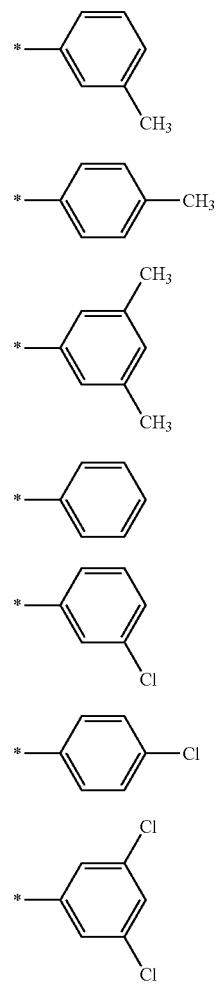

In formulae (II-1) and (II-2), a combination in which $R^4$ is a substituent group represented by structural formula d when $R^3$ is a substituent group represented by structural formula 1, a combination in which $R^4$ is a substituent group represented by structural formula f when $R^3$ is a substituent group represented by structural formula 2 and a combination in which $R^4$ is a substituent group represented by structural formula g when $R^3$ is a substituent group represented by structural formula 3 are excluded from the present invention.

The 2-position and 6-position protection step can be carried out using, for example, the method disclosed in Macromol. Biosci 1, 49-54, 2001. Specifically, it is possible to dissolve in a mixture of N,N-dimethylacetamide (DMAc) and lithium chloride (LiCl) (at approximately 100° C.), add imidazole (at a quantity of approximately 2.4 equivalents relative to the number of hydroxyl groups at the 2-position and 6-position) and TMDS-Cl (thexyldimethylsilyl chloride: at a quantity of approximately 2 equivalents relative to the number of hydroxyl groups at the 2-position and 6-position) dropwise incrementally to the solution (at approximately 100° C.), and allow a reaction to progress for approximately 24 hours.

In this way, hydroxyl groups at the 2-position and 6-position of amylose are substituted by thexyldimethylsilyl groups.

Following the 2-position and 6-position protection step, the method has a 3-position modification step in which the hydroxyl group at the 3-position of the constituent unit, whose 2-position and 6-position are protected, is modified by a first substituent group represented by formula (II-1) above.

In order to effect modification by the first substituent group represented by formula (II-1), modification of the hydroxyl group at the 3-position by the first substituent group may be carried out by reacting an isocyanate having a structure represented by formula (II-1) above with the hydroxyl group at the 3-position of amylose using an appropriate solvent or the like under appropriate conditions (for example, in pyridine at approximately 80° C.)

In this way, the hydroxyl group at the 3-position of amylose can be substituted by the first substituent group represented by formula (II-1).

An example of the 2-position and 6-position deprotection step in which protecting groups at the 2-position and 6-position of the constituent unit whose 3-position is modified are removed is a step of dispersing amylose, in which the 2-position and 6-position are modified by protecting groups and in which the 3-position is modified by the substituent group represented by formula (II-1), in an appropriate solvent (for example, THF), adding tetrabutyl ammonium fluoride (TBAF: approximately 50° C.) to this solution, and allowing a reaction to progress for approximately 24 hours.

Next, an example of the 2-position and 6-position modification step in which hydroxyl groups at the 2-position and 6-position, from which protecting groups have been removed, are modified by a second substituent group represented by formula (II-2) is a step of reacting an isocyanate having a structure represented by formula (II-2) above with the hydroxyl groups at the 2-position and 6-position of amylose using an appropriate solvent or the like under appropriate conditions (for example, for approximately 14 hours in pyridine at approximately 80° C.) in order to effect modification of the 2-position and 6-position by the substituent group represented by formula (II-2), in the same way as in the 3-position modification step.

In this way, the hydroxyl group at the 3-position of amylose can be substituted by the second substituent group represented by formula (II-2).

In cases where $R^3$ is a substituent group represented by structural formula 1 in the first substituent group represented by formula (II-1), $R^4$ is preferably a substituent group represented by any of structural formulae a, b, e and f, more preferably a substituent group represented by any of structural formulae a, e and f, and particularly preferably a substituent group represented by structural formula a in the second substituent group represented by formula (II-2).

In cases where $R^3$ is a substituent group represented by structural formula 2 in the first substituent group represented by formula (II-1), $R^4$ is preferably a substituent group represented by any of structural formulae a, c, d, e and g, more preferably a substituent group represented by any of structural formulae c and e, and particularly preferably a substituent group represented by structural formula c in the second substituent group represented by formula (II-2).

In cases where $R^3$ is a substituent group represented by structural formula 3 in the first substituent group represented by formula (II-1), $R^4$ is preferably a substituent group represented by any of structural formulae a, b, d, e and f, more preferably a substituent group represented by any of structural formulae a and d, and particularly preferably a substituent group represented by structural formula a in the second substituent group represented by formula (II-2).

The optical isomer separating agent of the present invention contains the amylose derivative of the present invention. The optical isomer separating agent of the present invention may be constituted only from the amylose derivative of the present invention, but may also be constituted from a carrier such as silica gel and the amylose derivative of the present invention supported on this carrier, and may be in the form of a single body housed integrally in a column or in the form of particles filled in a column. The optical isomer separating agent of the present invention may be produced from a publicly known optical isomer separating agent that contains an amylose derivative in addition to using the amylose derivative of the present invention.

More specifically, an optical isomer separating agent can be produced by supporting the amylose derivative of the present invention on a carrier, pulverizing the amylose derivative per se or obtaining spherical particles of the amylose derivative using a publicly known method (for example, see Japanese Patent Application Publication No. H7-285889). Moreover, "supporting" in this case means that the amylose derivative is immobilized on a carrier. The method for supporting the amylose derivative can be a publicly known supporting method, and can be a method such as physical adsorption between the amylose derivative and a carrier, chemical bonding between the amylose derivative and a carrier, chemical bonding between the amylose derivative, chemical bonding between the amylose derivative and/or a carrier and a third component, irradiation of the amylose derivative with light, or a radical reaction (for example, see Japanese Patent Application Publication No. H6-93002).

Examples of carriers include porous organic carriers and porous inorganic carriers, and the use of a porous inorganic carrier is preferred. The average particle diameter of the porous carrier is preferably 1 nm to 100 μm, and more preferably 5 nm to 5 μm. Suitable porous organic carriers include polymeric substances comprising polystyrene, polyacrylamide, polyacrylates and the like, and suitable porous inorganic carriers include silica gel, alumina, zirconia, magnesia, glass, kaolin, titanium oxide, silicates and hydroxyapatite. In addition, the form of the porous inorganic carrier may, in addition to a particulate carrier, be a mesh-like inorganic-based carrier such as an organic-inorganic composite material or a cylindrical integrated inorganic-based carrier able to be held in a column, such as those disclosed in Japanese Patent Application Publication Nos. 2005-17268 and 2006-150214.

A particularly preferred carrier is silica gel, and the particle diameter of the silica gel is 1 μm to 1 mm, preferably 1 to 300 μm, and more preferably 1 to 100 μm. In addition, it is possible to use a carrier that has been subjected to a treatment for improving affinity with the polysaccharide derivative or a treatment for modifying the characteristics of the surface of the carrier per se. Examples of surface treatment methods include silanization treatment using an organic silane compound such as aminopropylsilane and surface treatment methods involving plasma polymerization. The quantity of amylose derivative supported on the character is preferably 1 to 100 parts by mass, more preferably 5 to 60 parts by mass, and particularly preferably 10 to 40 parts by mass, relative to 100 parts by mass of the optical isomer separating agent.

Examples

Examples are given below, but the present invention is not limited to these examples.

Synthesis Examples Synthesis of Amylose Derivatives (1a to 1g, 2a to 2g and 3a to 3g)

Substitution was carried out by position-specific substitution of the 2-position, 6-position and 3-position of amylose by phenyl carbamate groups. This method was carried out in accordance with the method disclosed in Macromol Biosci 1, 49-54, 2001.

The specific reaction order is as follows.

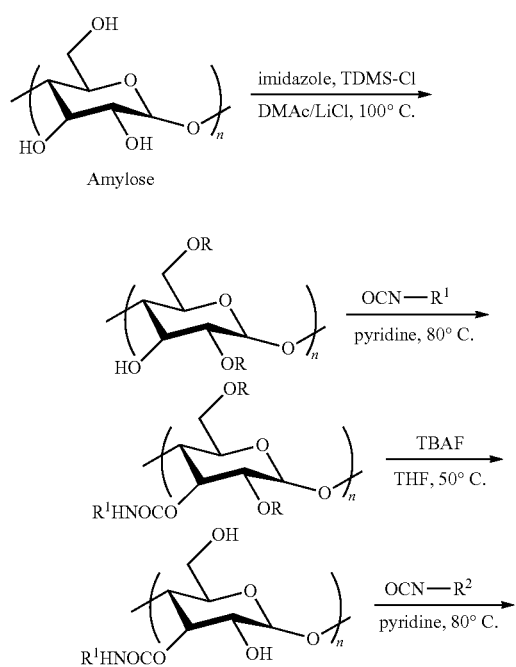

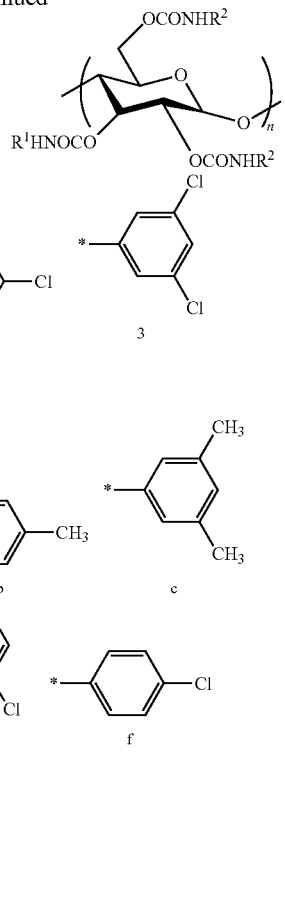

In order to selectively protect the 2-position and 6-position of amylose, 3.0 g of amylose was dissolved in a mixture of DMAc (dimethylacetamide) and LiCl (lithium chloride) (at 100° C.), and imidazole (at a quantity of 2.4 equivalents relative to the number of hydroxyl groups at the 2-position and 6-position) and TMDS-Cl (thexyldimethylsilyl chloride: at a quantity of 2 equivalents relative to the number of hydroxyl groups at the 2-position and 6-position) were added dropwise incrementally to the solution (at 100° C.)

A reaction was then allowed to progress for 24 hours so as to protect the hydroxyl groups at the 2-position and 6-position of amylose with thexyldimethylsilyl ether.

The reaction mixture was added to an excess of a phosphate buffer solution (which was obtained by dissolving 1.79 g of $K_2HPO_4$ and 0.89 g of $KH_2PO_4$ in 250 mL of distilled water).

After thoroughly washing the obtained precipitated product with ethanol and water, a product was obtained as an insoluble component (yield: 80% to 100%).

The obtained 2, 6-di-O-thexyldimethylsilylamylose was reacted with phenyl isocyanate, 4-chlorophenyl isocyanate or 3,5-dichlorophenyl isocyanate in pyridine at 80° C. so as to convert the hydroxyl group at the 3-position of amylose into the corresponding phenyl carbamate group. The yield of product obtained as methanol-insoluble components was 85% to 100%.

Next, the obtained 2, 6-di-O-thexyldimethylsilyl-3-(phenylcarbamoyl, 4-chlorophenylcarbamoyl or 3,5-dichlorophenylcarbamoyl)amylose was dispersed in THF, tetrabutylammonium fluoride trihydrate: TBAF) (as a catalyst at a quantity of 20 wt % relative to the THF), and the obtained mixture was stirred for 24 hours at 50° C. so as to deprotect the thexyldimethylsilyl ether groups.

Next, by reacting the hydroxyl groups at the 2-position and 6-position of the produced amylose with an excess of phenyl isocyanate, 4-chlorophenyl isocyanate or 3,5-dichlorophenyl isocyanate for 14 hours at 80° C., these hydroxyl groups were substituted by phenyl carbamate groups.

By carrying out this procedure, 18 types of amylose derivative (amylose derivatives 1a to 1g, 2a to 2g and 3a to 3g) were obtained as methanol-insoluble components (the yield was 85% to 1000).

The obtained 18 types of amylose derivative were combinations of $R^1$ and $R^2$ shown below, excluding cases in which $R^1$ and $R^2$ are the same.

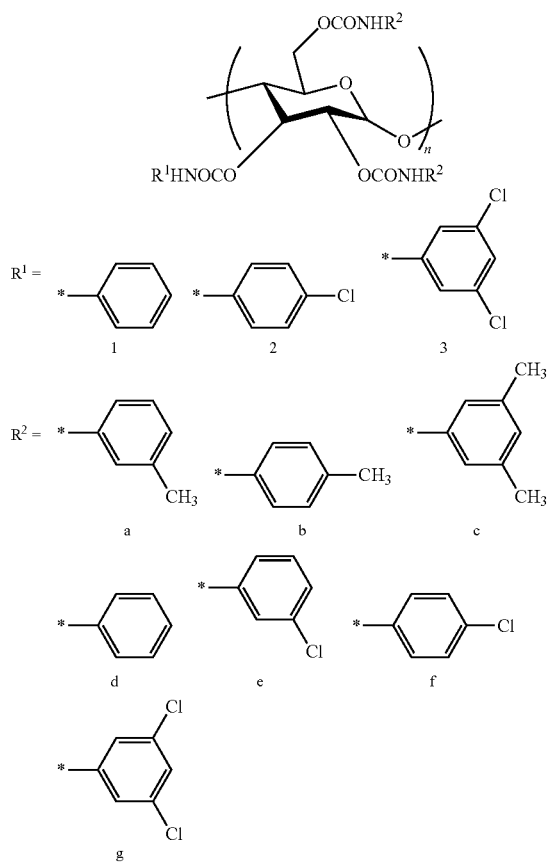

Tests involving the use of chromatography were carried out at room temperature using a JASCO PU-2089 chromatographic apparatus equipped with UV-Vis (JASCO UV-2070) and circular dichroism (JASCO CD-2095) measurement devices.

A racemate solution (3 mg/mL) was injected into an intelligent sampler (JASCO AS-2055).

A $^1$H-NMR spectrum (500 MHz) was measured at 80° C. in pyridine-$d_5$ using a Bruker-500 spectrometer (Bruker, USA).

Thermogravimetric analysis (TGA) was carried out using a TGA Q50 apparatus (TA, USA).

[Results of $^1$H-NMR Analysis and Thermogravimetric Analysis]

$^1$H-NMR analysis results for amylose 1f (in which the 3-position was substituted by the substituent group represented by structural formula 1, and the 2-position and 6-position were substituted by the substituent group represented by structural formula f; similar nomenclature is used below) are shown in FIG. 1. Characteristic peaks were observed in amylose derivative 1f.

The other amylose derivatives were also subjected to $^1$H-NMR analysis, and the structures thereof were confirmed in the same way.

Elemental analysis results for several of the amylose derivatives are shown in Table 1. The results show good conformity between theoretical values and measured values.

TABLE 1

| | Calculated(%)[a] | | | Found(%) | | |
|---|---|---|---|---|---|---|
| Derivatives | C | H | N | C | H | N |
| 1b | 64.46 | 6.11 | 7.27 | 64.23 | 6.12 | 6.92 |
| 1c | 65.44 | 6.49 | 6.94 | 64.89 | 6.31 | 6.64 |
| 1e | 56.32 | 4.73 | 6.79 | 55.96 | 4.47 | 6.25 |
| 1g | 50.67 | 3.96 | 6.11 | 50.21 | 3.62 | 5.98 |
| 2b | 60.83 | 5.60 | 6.87 | 60.27 | 5.68 | 6.52 |
| 2c | 61.92 | 5.98 | 6.56 | 61.36 | 5.77 | 6.39 |
| 2e | 53.35 | 4.32 | 6.44 | 53.18 | 4.12 | 6.21 |
| 2g | 48.26 | 3.63 | 5.82 | 48.08 | 3.22 | 5.38 |
| 3b | 57.59 | 5.14 | 6.50 | 57.24 | 5.01 | 6.25 |
| 3c | 58.76 | 5.53 | 6.23 | 58.18 | 5.21 | 6.04 |
| 3d | 56.32 | 4.73 | 6.79 | 56.05 | 4.68 | 6.58 |
| 4e | 50.67 | 3.96 | 6.11 | 50.26 | 4.05 | 5.88 |

[a]Esimated based on a repeated glucose unit.

[Preparation of Chiral Stationary Phase]

0.35 g of each of the 18 types of amylose derivative was dissolved in 8 mL of THF and coated on 1.40 g of silica gel that had been treated with aminopropylsilane, in accordance with the disclosures in J. Chromatogr. A 363, 173-186, 1986. The silica gel was wide pore silica gel (average particle diameter 7 μm, average pore diameter 100 nm: Daiso gel SP-1000).

Each of the silica gels was charged in a stainless steel column (25×0.20 cm i.d.) using a slurry method.

The number of theoretical plates in each filled column was 1800 to 2800 for a flow rate of 0.1 mL/min using benzene (hexane/2-propanol (90/10, v/v)) as an eluant.

The dead time ($t_0$) was calculated using 1,3,5-tributylbenzene as a non-retentive compound.

[Results of Racemate Separation by HPLC, and Discussion]

10 types of racemate represented by 4 to 13 below were analyzed by means of HPLC using fillers obtained using the amylose derivatives prepared in the manner described above.

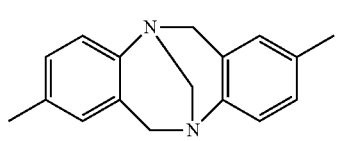

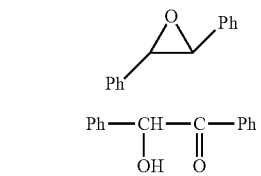

-continued

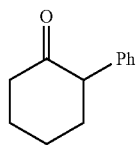

7

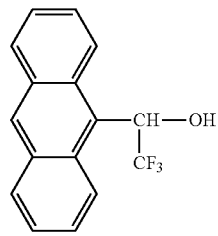

8

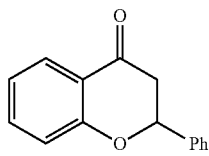

9

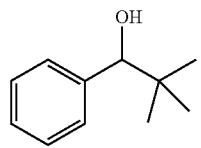

10

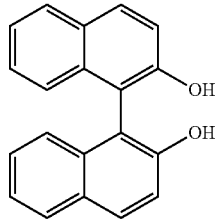

12

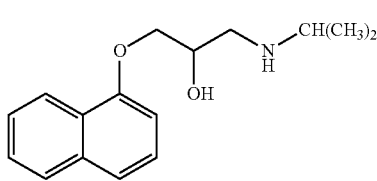

13

Figure 2:
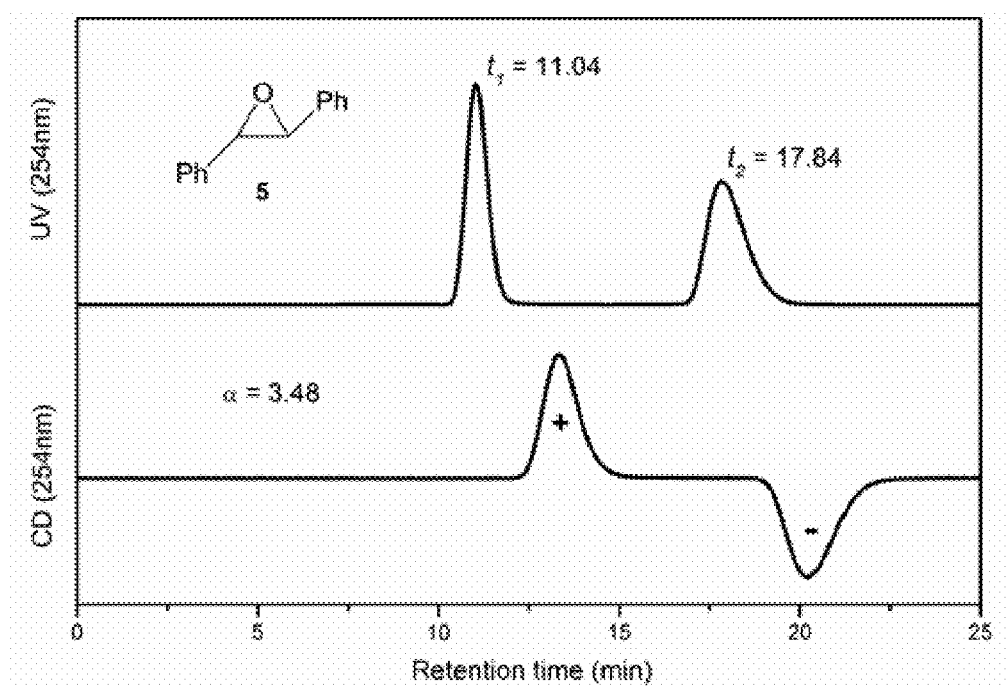
FIG. 2 is a diagram showing a chromatogram obtained by separating racemate 5 using amylose derivative 1f.

FIG. 2 is a chromatogram obtained by separating trans-stilbene oxide (racemate 5) using a filler coated with amylose derivative 1f. The enantiomers were separated at retention times $t_1$ and $t_2$. The dead time ($t_0$) was 8.28 minutes when 1,3,5-tri-tert-butylbenzene was used.

The retention coefficients ($k_1'$ (($t_1-t_0$)/$t_0$) and $k_2'$ (($t_2-t_0$)/$t_0$)) were 0.33 and 1.15 respectively, and the separation coefficient α ($k_2'/k_1'$) was 3.48. As is clear from FIG. 2, racemate 5 was sufficiently separated.

The results obtained when separating racemates 4 to 13 using fillers coated with amylose derivatives 1a to 1g, 2a to 2g and 3a to 3g are summarized in Tables 2 to 4.

The HPLC conditions are as shown in the tables.

Moreover, the tables show results obtained when separating the racemates using fillers obtained using Chiralpak AD (amylose tris(3,5-dimethylphenyl carbamate)) as a chiral selector.

Going from left to right in the tables, the electron-withdrawing effect of the substituent groups increases.

<Amylose Derivatives 1a to 1g (1d is a Reference Example)>

Results obtained when separating the racemates using fillers obtained using amylose derivatives 1a to 1g are summarized in Table 2A and 2B below.

TABLE 2A

| Race-mates | 1a[a] k1' | α | 1b[a] k1' | α | 1c[a] k1' | α | 1d[b] k1' | α |
|---|---|---|---|---|---|---|---|---|
| 4 | 0.42(+) | 1.71 | 0.58(+) | 1.19 | 0.62(+) | 1.63 | 0.77(+) | 1.28 |
| 5 | 0.27(+) | 2.48 | 0.28(+) | 1.61 | 0.52(+) | 2.50 | 0.39(+) | 1.46 |
| 6 | 2.57(−) | 1.35 | 2.25(−) | ~1 | 3.90(−) | 1.17 | 3.72(+) | ~1 |
| 7 | 0.56 | 1.0 | 0.70 | 1.0 | 0.74 | 1.0 | 1.19(−) | ~1 |
| 8 | 0.83 | 1.0 | 0.84 | 1.0 | 1.72 | 1.12 | 0.61 | 1.0 |
| 9 | 0.42(+) | ~1 | 0.62(+) | 1.29 | 0.34(+) | ~1 | 1.80(−) | 1.28 |
| 10 | 1.06(+) | 1.67 | 1.03(+) | 1.11 | 1.20(+) | ~1 | 2.21(+) | 1.51 |
| 11 | 0.28 | 1.0 | 0.25 | 1.0 | 0.55 | ~1 | | |
| 12 | 7.50(+) | 1.05 | 9.13(+) | ~1 | 11.55(+) | ~1 | | |
| 13 | 1.11(+) | 1.23 | 0.84 | 1.0 | 1.11 | 1.0 | | |

[a,b]Column: 25 cm × 0.20 cmID, Flow eate: 0.1 mL/min.
[b]Data taken from ref. 4
The signs in parentheses represent the circular dichroism detection at 254 nm of the first-eluted enantiomer. The signs in parentheses represent the optical rotation of the first-eluted enantiomer.

TABLE 2B

| Race-mates | 1e[a] k1' | α | 1f[a] k1' | α | 1g[a] k1' | α | Chiralpak AD[c] k1' | α |
|---|---|---|---|---|---|---|---|---|
| 4 | 0.72(+) | 1.60 | 0.65(+) | 1.32 | 0.69(+) | 1.45 | 0.53(+) | 1.58 |
| 5 | 0.30(+) | 2.43 | 0.33(+) | 3.48 | 0.41(+) | 1.49 | 0.42(+) | 3.04 |
| 6 | 3.18(−) | 1.24 | 2.55(−) | 1.22 | 4.72 | 1.0 | 3.14(−) | 1.21 |
| 7 | 0.71 | 1.0 | 0.98(−) | | 1.06 | 1.0 | 0.61(−) | ~1 |
| 8 | 0.58 | 1.0 | 0.43 | 1.0 | 0.36 | 1.0 | 1.30(+) | 1.15 |
| 9 | 0.48(+) | ~1 | 1.19(+) | ~1 | 0.56(+) | ~1 | 0.25(−) | ~1 |
| 10 | 1.32(+) | 1.63 | 1.37(+) | ~1 | 1.39(+) | ~1 | 0.93(+) | 1.12 |
| 11 | 0.26 | 1.0 | 0.20(+) | ~1 | 0.29(+) | ~1 | | |
| 12 | 2.78(+) | ~1 | 5.89(+) | 1.07 | 7.02 | 1.0 | | |
| 13 | 0.18 | 1.0 | 0.89 | 1.0 | 0.87 | 1.0 | | |

[a]Column: 25 cm × 0.20 cmID, Flow eate: 0.1mL/min.
[c]Data taken from ref. 5 Column: 25 cm × 0.46 cmID, Flow eate:0.5 mL/min. Eluent: hexane/2-propanol = 90/10,v/v
The signs in parentheses represent the circular dichroism detection at 254 nm of the first-eluted enantiomer. The signs in parentheses represent the optical rotation of the first-eluted enantiomer.

Among amylose derivatives 1a to 1g, amylose derivative 1a (2,6-bis(3-methylphenyl carbamate) exhibited the best optical resolution performance for the racemates. Separation was particularly good for racemates 4, 5, 6, 10, 12 and 13. This shows that a compound in which 3-methylphenyl carbamate, which is an electron donor, is substituted at the 2-position and 6-position and phenyl carbamate is substituted at the 3-position is effective for identifying a chiral drug such as racemate 13.

Fillers obtained using amylose derivatives 1a and 1e showed good separation results for racemate 10. This may be due to the introduction of a phenyl carbamate group, which is an aromatic ring, at the 2-position and 6-position, which are meta-positions.

Others among amylose derivative 1 also exhibited good separation performance for the racemates. In particular, cases in which Chiralpak AD was used could not separate racemate 9, but amylose derivative 1b exhibited excellent separation of racemate 9.

<Amylose Derivatives 2a to 2g (2f is a Reference Example)>

In amylose derivatives 2a to 2g, a 4-chlorophenyl carbamate group was introduced at the 3-position of amylose.

Results for separation of the racemates by fillers obtained using these amylose derivatives are summarized in Table 3A and 3B below.

TABLE 3A

| Race-mates | 2a[a] k1' | α | 2b[a] k1' | α | 2c[a] k1' | α | 2d[a] k1' | α |
|---|---|---|---|---|---|---|---|---|
| 4 | 0.99(+) | 1.51 | 0.68(+) | 1.24 | 0.77(+) | 1.79 | 0.83(+) | 1.37 |
| 5 | 0.52(+) | 2.48 | 0.37(+) | 2.43 | 0.66(+) | 2.86 | 0.47(+) | 1.79 |
| 6 | 4.79(−) | 1.20 | 2.70(−) | ~1 | 4.29(−) | 1.12 | 4.08(−) | ~1 |
| 7 | 1.51(−) | ~1 | 0.84 | 1.0 | 1.01 | 1.0 | 1.14 | 1.0 |
| 8 | 0.61 | 1.0 | 0.77 | 1.0 | 1.40(−) | 1.19 | 0.8 | 1.0 |
| 9 | 1.05(+) | 1.15 | 0.83(+) | ~1 | 0.38(+) | ~1 | 1.35(+) | 1.39 |
| 10 | 1.93(+) | 1.52 | 1.17(+) | ~1 | 1.46(+) | 1.21 | 1.91(+) | 1.54 |
| 11 | 0.39(+) | ~1 | 0.30 | 1.0 | 0.55 | 1.0 | 0.35 | 1.0 |
| 12 | 7.51(+) | 1.05 | 9.55(+) | ~1 | 15.26(+) | 1.11 | 10.80(+) | 1.08 |
| 13 | 1.53 | 1.0 | 0.80 | 1.0 | 1.16 | 1.0 | 1.11 | 1.0 |

[a]Column: 25 cm × 0.20 cmID, Flow eate: 0.1mL/min.
The signs in parentheses represent the circular dichroism detection at 254 nm of the first-eluted enantiomer. The signs in parentheses represent the optical rotation of the first-eluted enantiomer.

TABLE 3B

| Race-mates | 2e[a] k1' | α | 2f[b] k1' | α | 2g[a] k1' | α | Chiralpak AD[c] k1' | α |
|---|---|---|---|---|---|---|---|---|
| 4 | 0.61(+) | 1.59 | 0.79(+) | 1.37 | 1.04(+) | 1.49 | 0.53(+) | 1.58 |
| 5 | 0.41(+) | 2.10 | 0.53(+) | 3.02 | 0.54(+) | 1.33 | 0.42(+) | 3.04 |
| 6 | 3.52(−) | 1.20 | 5.14(−) | 1.40 | 6.72(−) | ~1 | 3.14(−) | 1.21 |
| 7 | 0.84(−) | ~1 | 1.85(−) | 1.18 | 1.59 | 1.0 | 0.61(−) | ~1 |
| 8 | 0.92 | 1.0 | 0.67 | 1.17 | 0.60 | 1.0 | 1.30(+) | 1.15 |
| 9 | 0.55(+) | ~1 | 1.32(+) | ~1 | 0.60 | 1.0 | 0.25(−) | ~1 |
| 10 | 1.47(+) | 1.56 | 0.88(+) | 1.37 | 1.88(+) | 1.13 | 0.93(+) | 1.12 |
| 11 | 0.37(+) | ~1 | | | 0.42(+) | ~1 | | |
| 12 | 6.93(+) | ~1 | | | 8.79(+) | ~1 | | |
| 13 | 1.02(+) | 1.27 | | | 1.49 | 1.0 | | |

[a,b]Column: 25 cm × 0.20 cmID, Flow eate: 0.1 mL/min.
[b]Data taken from ref. 4
[c]Data taken from ref. 5 Column: 25 cm × 0.46 cmID, Flow eate: 0.5 mL/min. Eluent: hexane/2-propanol = 90/10,v/v
The signs in parentheses represent the circular dichroism detection at 254 nm of the first-eluted enantiomer. The signs in parentheses represent the optical rotation of the first-eluted enantiomer.

Amylose derivatives 2a, 2c, 2d and 2e exhibited good separation of 5 racemates. However, differences in racemate separation occurred, depending on the type of amylose derivative. For example, racemate 8 was separated by amylose derivative 2c. Racemate 9 was separated by amylose derivatives 2a and 2d. Amylose derivative 2c (2,6-bis(3,5-dimethylphenyl carbamate) exhibited relatively high separation performance for racemates 4 to 8 and 12 in particular.

Figure 3:
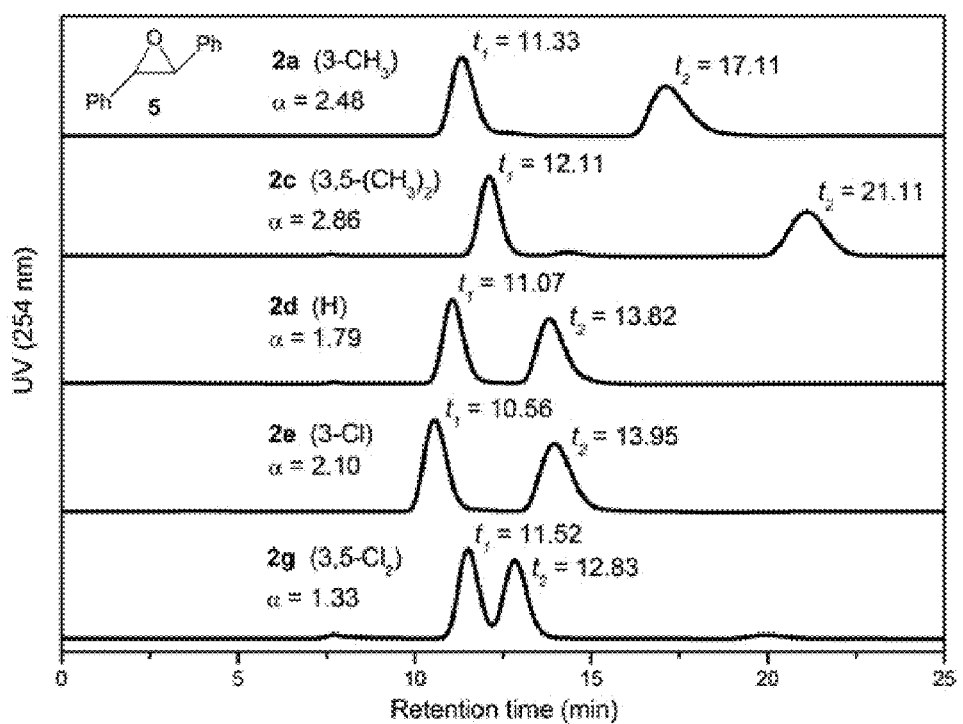
FIG. 3 is a diagram showing chromatograms obtained by separating racemate 5 using amylose 3-(4-chlorophenyl carbamate) derivatives (2a, 2c, 2d, 2e and 2g).

A chromatogram showing separation results for racemate 5 is shown in FIG. 3.

In light of these results, it is thought that the presence or absence of electron-withdrawing groups in phenyl groups affects separation.

Amylose derivative 2e exhibited the best separation for racemate 13.

<Amylose Derivatives 3a to 3g (3g is a Reference Example)>

In amylose derivatives 3a to 3g, 3,5-dichlorophenylcarbamate is introduced at the 3-position of amylose and electron-donating groups or electron-withdrawing groups are introduced at the 2-position and 6-position of amylose.

Results for separation of racemates by fillers obtained using these amylose derivatives are summarized in Table 4A and 4B below.

TABLE 4A

| Race-mates | 3a[a] k1' | α | 3b[a] k1' | α | 3c[a] k1' | α | 3d[a] k1' | α |
|---|---|---|---|---|---|---|---|---|
| 4 | 0.66(+) | 1.61 | 0.74(+) | 1.86 | 0.27(+) | 2.11 | 0.80(+) | 1.71 |
| 5 | 0.48(+) | 2.35 | 0.40(+) | 2.30 | 0.21(+) | 2.71 | 0.56(+) | 2.43 |
| 6 | 4.04(−) | 1.36 | 3.43(−) | 1.19 | 2.29(−) | ~1 | 4.23(−) | 1.30 |
| 7 | 0.95(−) | ~1 | 1.01 | 1.0 | 0.47 | 1.0 | 1.12 | 1.0 |
| 8 | 0.93 | 1.0 | 0.72 | 1.0 | 0.59 | 1.0 | 0.70 | 1.0 |
| 9 | 0.54(+) | ~1 | 0.40(+) | 1.28 | 0.08 | 1.0 | 0.74(+) | 1.20 |
| 10 | 1.63(+) | 1.33 | 1.57(+) | 1.23 | 0.60(+) | ~1 | 2.43(+) | 1.31 |
| 11 | 0.40(+) | ~1 | 0.29(+) | ~1 | 0.18(+) | ~1 | 0.34(-) | ~1 |
| 12 | 7.84(+) | 1.03 | 11.72(+) | ~1 | 7.80(−) | ~1 | 11.66(+) | ~1 |
| 13 | 1.19(+) | 1.27 | 1.11 | 1.0 | 0.65 | 1.0 | 1.42 | 1.0 |

[a]Column: 25 cm × 0.20 cmID, Flow eate: 0.1 mL/min.
The signs in parentheses represent the circular dichroism detection at 254 nm of the first-eluted enantiomer. The signs in parentheses represent the optical rotation of the first-eluted enantiomer.

TABLE 4B

| Race-mates | 3e[a] k1' | α | 3f[a] k1' | α | 3g[b] k1' | α | Chiralpak AD[c] k1' | α |
|---|---|---|---|---|---|---|---|---|
| 4 | 0.88(+) | 1.48 | 0.40(+) | 1.65 | 0.84(+) | 1.34 | 0.53(+) | 1.58 |
| 5 | 0.49(+) | 2.16 | 0.25(+) | 2.52 | 0.50(+) | 1.32 | 0.42(+) | 3.04 |
| 6 | 5.09(−) | 1.16 | 1.51(−) | 1.26 | 6.08(−) | ~1 | 3.14(−) | 1.21 |
| 7 | 1.40(−) | ~1 | 0.76 | 1 | 1.26(−) | ~1 | 0.61(−) | ~1 |
| 8 | 0.58 | 1.0 | 0.35 | 1.0 | 0.37 | 1.0 | 1.30(+) | 1.15 |
| 9 | 0.90(+) | 1.14 | 0.54(+) | ~1 | 0.63(+) | ~1 | 0.25(−) | ~1 |
| 10 | 1.84(+) | 1.24 | 0.74(+) | ~1 | 1.62(+) | 1.10 | 0.93(+) | 1.12 |
| 11 | 0.35(+) | ~1 | 0.18(+) | ~1 | | | | |
| 12 | 7.76(+) | 1.06 | 9.06(+) | ~1 | | | | |
| 13 | 1.55(+) | 1.28 | 0.50 | 1.0 | | | | |

[a,b]Column: 25 cm × 0.20 cmID, Flow eate: 0.1 mL/min.
[b]Data taken from ref. 4
[c]Data taken from ref. 5 Column:25 cm × 0.46 cmID, Flow eate: 0.5 mL/min. Eluent: hexane/2-propanol = 90/10,v/v
The signs in parentheses represent the circular dichroism detection at 254 nm of the first-eluted enantiomer. The signs in parentheses represent the optical rotation of the first-eluted enantiomer.

Fillers obtained using amylose derivatives 3a, 3b, 3d and 3e exhibited good separation performance for 5 or 6 racemates.

Amylose derivative 3a exhibited high separation performance for racemates 6, 10 and 13. Amylose derivative 3b exhibited high separation performance for racemate 9. Amylose derivative 3e exhibited high separation performance for racemates 12 and 13. Racemate 9, which could not be separated using Chiralpak AD, could be separated by fillers obtained using amylose derivatives 3b, 3d and 3e. Amylose derivatives 3a and 3e were able to separate propranolol (13).

A filler obtained using amylose derivative 3c (3,5-dimethyl group) exhibited good separation performance for racemates 4 and 5.

Amylose derivatives 3a to 3f exhibited better separation performance for racemates 4, 6, 9 and 10 than Chiralpak AD.

In fillers obtained using amylose derivatives 1a to 1g, 2a to 2g and 3a to 3g, the fact that racemates 6 and 12 have a higher retention coefficient $k_1'$ than other racemates means that interactions between the phenyl carbamate groups in the amylose derivatives and these racemates are strong, and means that the effect of substituent groups on the phenyl carbamate groups at the 2-position and 6-position may be hardly exerted.

When used in an optical isomer separating agent, the amylose derivative of the present invention exhibits similar or better applicability in comparison with existing optical isomer separating agents and exhibits higher optical separation performance than existing optical isomer separating agents depending on the type of racemate to be subjected to optical resolution. Therefore, the amylose derivative and optical isomer separating agent of the present invention enable separation of optical isomers that could not be satisfactorily separated using existing optical isomer separating agents, and can be used to develop, for example, new drugs in which such optical isomers are used.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-165637, filed on Aug. 26, 2016, which is hereby incorporated by reference herein in its entirety.

What is claimed is:

1. An amylose derivative having a constituent unit represented by formula (I) below:

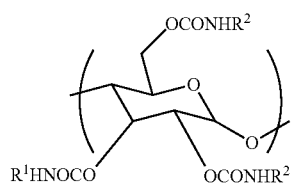

(I)

wherein, in formula (I), $R^1$ is a substituent group represented by any of structural formulae 1 to 3 below, $R^2$ is a substituent group represented by any of structural formulae a to g below, and two $R^2$ groups are the same substituent group, $R^1$ and $R^2$ are different substituent groups, and a combination of $R^1$ and $R^2$ in which $R^1$ is a substituent group represented by structural formula 3 and $R^2$ is a substituent group represented by structural formula c is excluded from the formula (I)

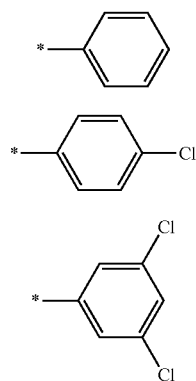

1

2

3

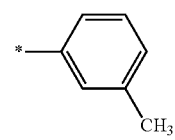

a

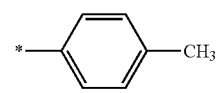

b

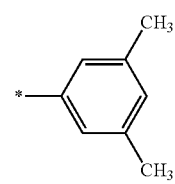

c

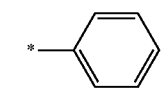

d

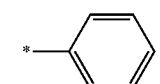

e

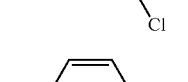

f

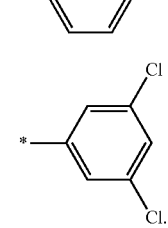

g

2. The amylose derivative according to claim 1, wherein $R^1$ is a substituent group represented by the structural formula 1 and $R^2$ is a substituent group represented by any of the structural formulae a, b, e and f in the constituent unit represented by the formula (I).

3. The amylose derivative according to claim 1, wherein $R^2$ is a substituent group represented by the structural formula 2 and $R^2$ is a substituent group represented by any of the structural formulae a, c, d, e and g in the constituent unit represented by the formula (I).

4. The amylose derivative according to claim 1, wherein $R^1$ is a substituent group represented by the structural formula 3 and $R^2$ is a substituent group represented by any of the structural formulae a, b, d, e and f in the constituent unit represented by the formula (I).

5. An optical isomer separating agent, which is constituted from a carrier and the amylose derivative according to claim 1 which is carried by the carrier.